United States Patent [19]

Katayama et al.

[11] Patent Number: 5,126,522
[45] Date of Patent: Jun. 30, 1992

[54] INDUCTION HEATING APPARATUS FOR PREVENTING THE FORMATION OF STRIPES ON PLATED STEEL

[75] Inventors: Keiichi Katayama; Mitsuo Kato; Mikio Hanamoto; Kazuya Tsurusaki; Kiyoshi Izumi; Mamoru Hiyama, all of Hiroshima, Japan

[73] Assignee: Mitsubishi Jukogyo Kabushiki Kaisha, Tokyo, Japan

[21] Appl. No.: 454,422

[22] Filed: Dec. 21, 1989

[30] Foreign Application Priority Data

Jul. 14, 1989 [JP] Japan ................................. 1-182271

[51] Int. Cl.$^5$ ............................................. H05B 6/08
[52] U.S. Cl. .............................. 219/10.77; 219/10.71; 219/10.79; 219/10.61 R
[58] Field of Search ................. 219/10.71, 10.61 R, 219/10.43, 10.57, 10.75, 10.77, 10.79

[56] References Cited

U.S. PATENT DOCUMENTS

| | | | |
|---|---|---|---|
| 2,669,647 | 2/1954 | Segsworth | 219/10.71 |
| 3,921,092 | 11/1975 | Schatz | 219/10.77 |
| 4,357,512 | 11/1982 | Nishimoto et al. | 219/10.77 |
| 4,471,196 | 9/1984 | Frank et al. | 219/10.77 |
| 4,678,883 | 7/1987 | Saitoh et al. | 219/10.61 R |
| 4,755,648 | 7/1988 | Sawa | 219/10.77 |
| 4,761,530 | 8/1988 | Scherer et al. | 219/10.71 |
| 4,778,971 | 10/1988 | Sakimoto et al. | 219/10.71 |
| 4,795,872 | 1/1989 | Hagisawa et al. | 219/10.61 R |
| 4,845,332 | 7/1989 | Jancosek et al. | 219/10.77 |

FOREIGN PATENT DOCUMENTS

WO88/07804 10/1988 PCT Int'l Appl. .

OTHER PUBLICATIONS

"Induction Heating of Strip for Galvanneal," Iron and Steel Engineer, Jan. 1988, p. 4045.
"Induction Strip Galvannealing," ISG Ajax Magnethermic Corporation.

Primary Examiner—Philip H. Leung

[57] ABSTRACT

An induction heating apparatus is disclosed which includes a high frequency power source having a leading phase angle setting circuit, which is supplied with a detection voltage signal from an output side of a high frequency inverter connected to a load circuit, to supply a leading phase angle signal to gates of thyristors of the inverter. The high frequency power source further includes a phase control circuit, provided after the voltage detection circuit, which is supplied with the detection voltage signal from the output side of the inverter to periodically control a phase of the detection voltage signal. The induction heating apparatus further includes a series inductor provided in between the power supply bus line connected to an induction heating coil wherein a magnetic member is provided to be inserted into and taken out of the inductor. A drive device is included for driving the magnetic member. The induction heating apparatus includes a solenoid coil serving as an induction heating coil to which a high frequency current is supplied and into which a steel plate passes to be heated by Joule heat produced by an eddy current generated in the steel plate. Furthermore, magnetic flux density alleviating apparatus is provided in the solenoid coil for alleviating magnetic flux concentrated in an edge portion of the steel plate.

28 Claims, 17 Drawing Sheets

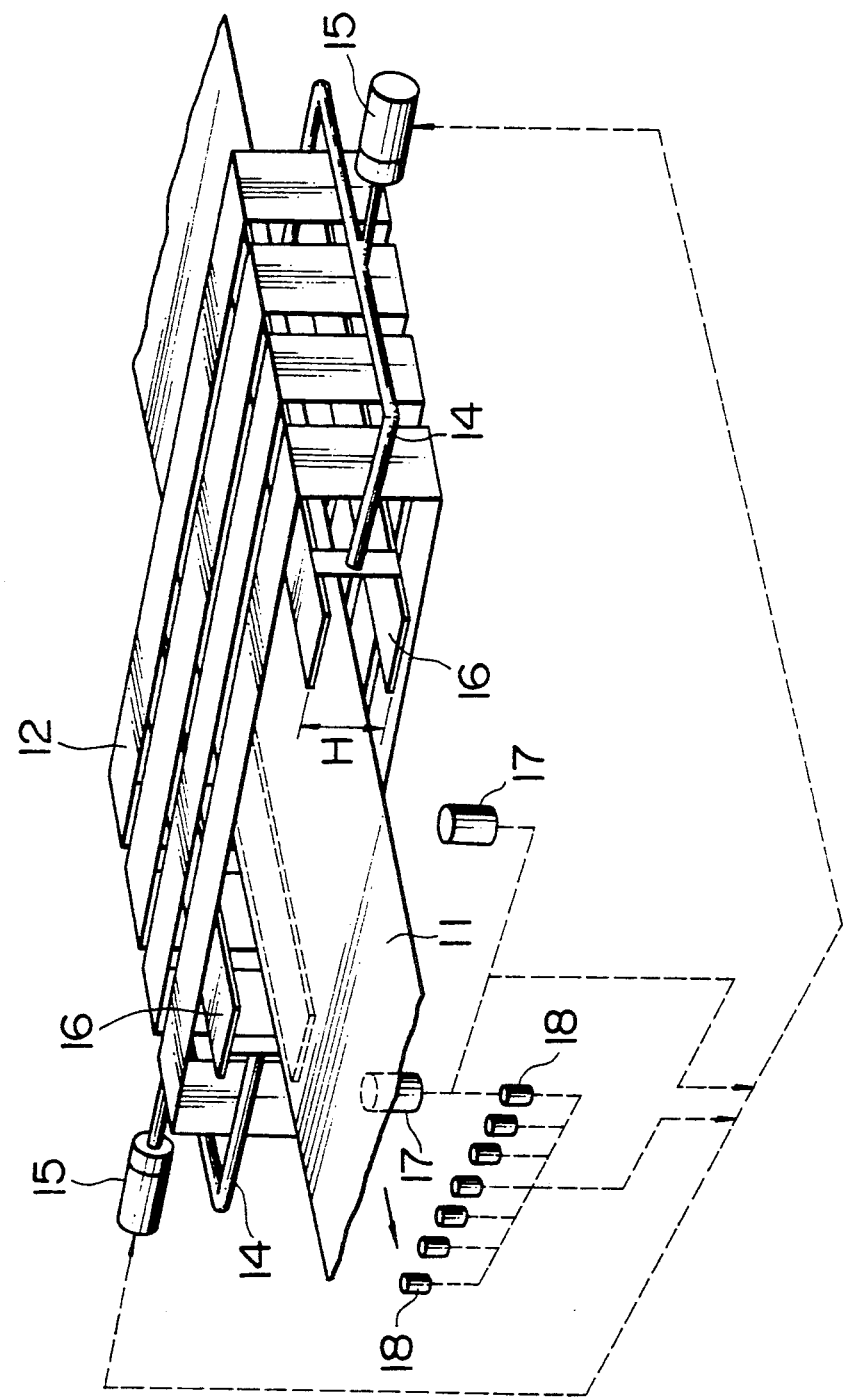

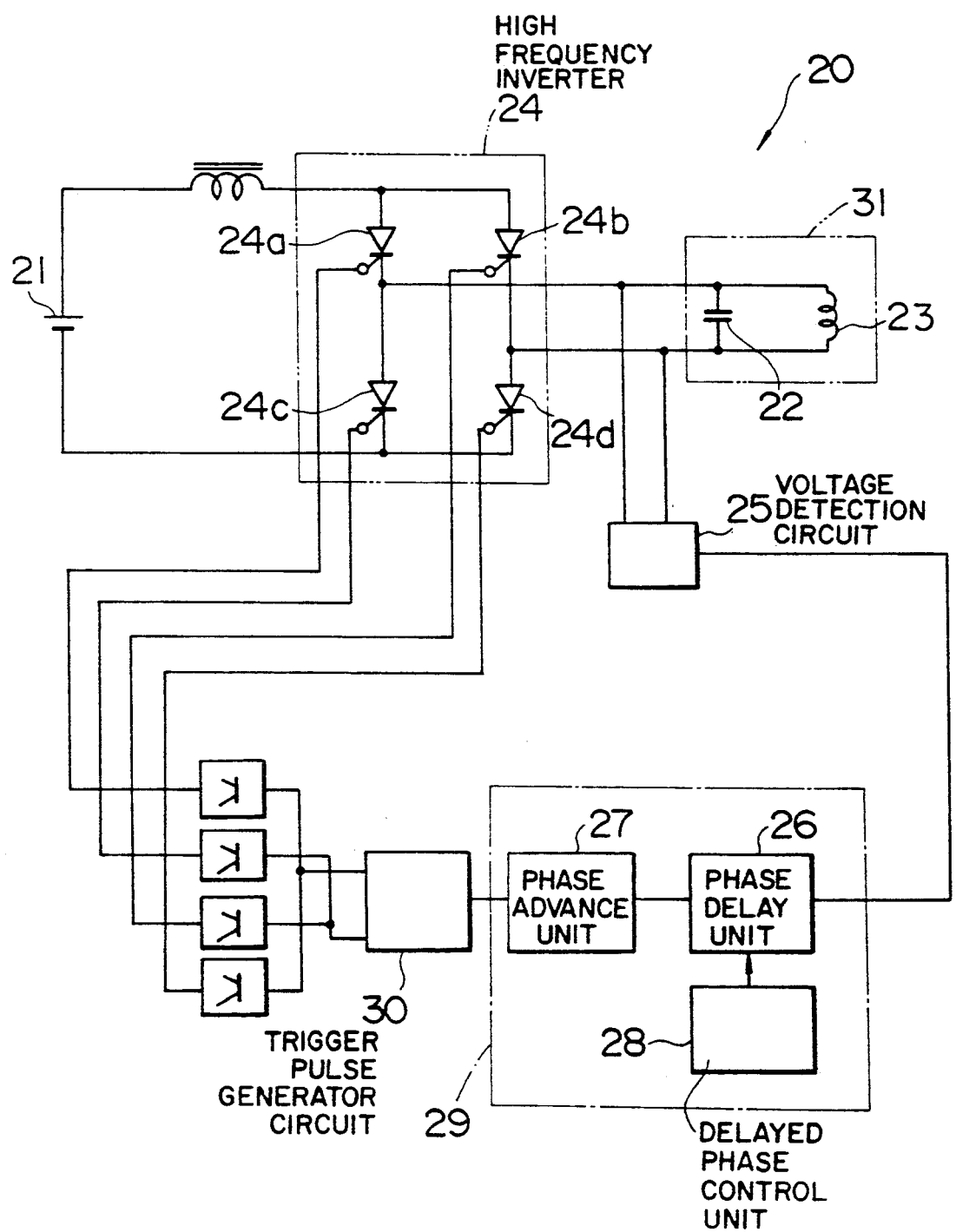

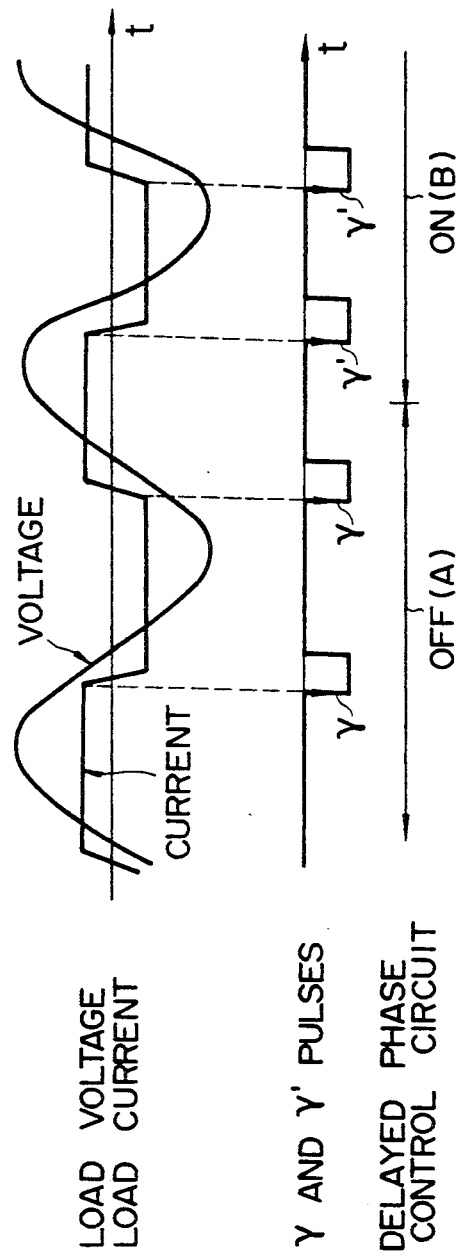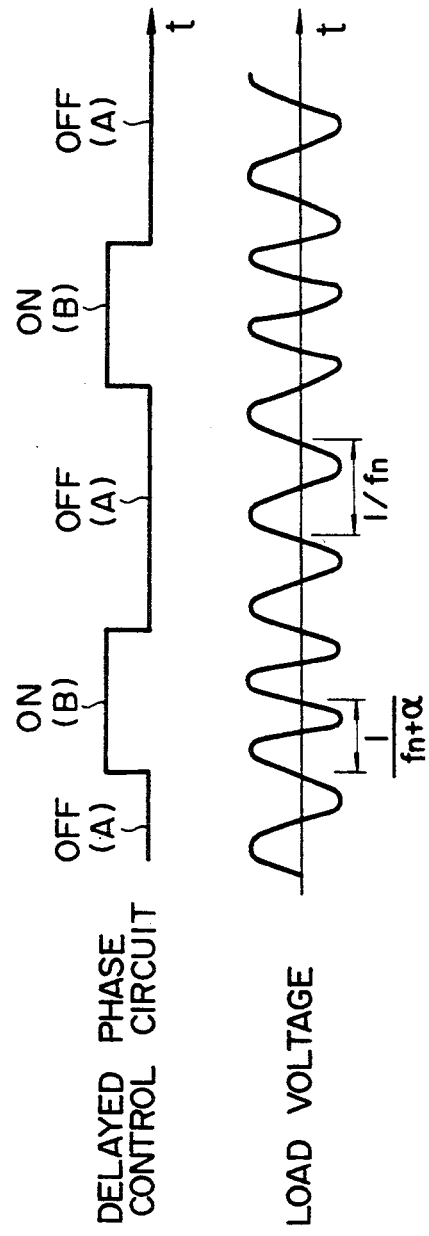
FIG. 7(a)
FIG. 7(b)

INDUCTION HEATING APPARATUS FOR PREVENTING THE FORMATION OF STRIPES ON PLATED STEEL

BACKGROUND OF THE INVENTION

1. Field of the Invention

The present invention relates to an induction heating apparatus which is applied used to heat zinc-plated steel plates, for example.

2. Description of the Background Art

Generally, as shown in FIGS. 11, 12 and 13, an induction heating furnace 120 of an induction heating apparatus which heats plated steel plate 119 uses a heating coil 115 of a solenoid type. The plated steel plate 119 which is continuously fed into the induction heating furnace 120 passes through the heating coil 115. A high frequency current is supplied to the heating coil 115 through a conductor 116 from a high frequency power source 117. Thus, as shown in FIG. 14, an induced current (eddy current) 122 is generated in the plated steel plate 119 as a result of the high frequency current 125 to heat the plated steel plate 119 so that an alloy of a plated layer 123 and a steel portion 124 is formed.

The conventional induction heating furnace 120 of the induction heating apparatus of this type, as shown in FIGS. 16 and 17, includes a solenoid coil 115 constituting an induction heating coil which is disposed in a coil support frame 126 and to which a high frequency current (1 to 50 KHz) suitable for a thickness of the steel plate is supplied. The steel plate passes through the solenoid coil 115 so that the steel plate is heated by the Joule heat due to an eddy current generated in the steel plate. In FIG. 17, numeral 127 denotes a heat insulating material.

Further, as shown in FIG. 18, the conventional high frequency power source 117 used in the induction heating furnace 120 includes a high frequency inverter 103 connected to a dc power source 111 having an output connected to a load coil 101 and a condenser 102 which are parallel-resonated, a voltage detection circuit 104 to which an output voltage of the high frequency inverter 103 is supplied, and a trigger pulse generating circuit 109 which supplies signals to each of gates of thyristors 103a, 103b, 103c and 103d constituting the high frequency inverter 103.

In the circuit shown in FIG. 18, the high frequency inverter 103 can be expressed by an equivalent circuit as shown in FIG. 19 in which the thyristors 103a, 103b, 103c and 103d are replaced by switches 113a, 113b, 113c and 113d, respectively, and the dc power source is connected to a load circuit 114. One state in which the switches 113a and 113d are closed and the switches 113b and 113c are opened and the other state in which the switches 113b and 113c are closed and the switches 113a and 113d are opened are alternately repeated to supply ac current to the load circuit 114.

The thyristors 103a, 103b, 103c and 103d can be turned on by external signals. However, since the thyristors can not be turned off by external signals, a state in which the thyristors 103a, 103b, 103c and 103d are simultaneously on is prepared and a reverse current is caused to flow through the pair of thyristors 103a and 103d or 103b and 103c which have been turned on earlier by a condenser 102 connected in parallel with the load coil 101 so that the pair of thyristors 103a and 103d or 103b and 103c are turned off.

In order to generate the state in which the thyristors 103a, 103b, 103c and 103d are on simultaneously, the trigger pulse generating circuit 109 supplies trigger pulses having a phase advanced by $\gamma$ angle with respect to a load voltage to the gates of the thyristors 103a and 103d or 103b and 103c to turn on the thyristors 103a and 103d or 103b and 103c at the timing advanced by $\gamma$ angle with respect to the load voltage. As a result the load circuit 114 is supplied with a load current having a phase advanced by $\gamma$ angle with respect to the load voltage and a frequency corresponding to a resonance frequency of the load circuit 114.

SUMMARY OF THE INVENTION

In the conventional apparatus, when the induced current (eddy current) 122 flows through the plated steel plate 119, compression force 121 is generated repeatedly at a fixed period corresponding to the frequency of the high frequency current 125 which alternates at a fixed period as shown in FIG. 14. As a result, the plated steel plate 119 is vibrated in the whidth direction of the plate as shown in FIG. 15. When the plated steel plate 119 is vibrated at the fixed period, the plated layer 123 heated in a melted state is also vibrated so that stripes 118, which are serious defects in the quality of the plated steel plate 119, are produced at regular intervals as shown in FIG. 13.

Further, when the steel plate 119 is subjected to induction heating by the conventional induction heating apparatus, magnetic fluxes concentrate in edge portions of the steel plate 119 and temperature at the edge portions of the steel plate 119 is increased as compared with that of the central portion of the steel plate as shown in FIG. 21.

An object of the present invention is to solve the problems as described above.

Accordingly, it is a first object of the present invention to provide an induction heating apparatus which can perform induction heating without production of any striped pattern on a plated steel plate.

It is a second object of the present invention to provide an induction heating apparatus which can induction-heat a steel plate uniformly.

In order to achieve the first object, the present invention comprises a leading phase angle setting circuit, which is supplied with a detection voltage signal from an output side of a high frequency inverter connected to a load circuit, to supply a leading phase angle signal to gates of thyristors constituting the high frequency inverter, and further comprises a phase control circuit, provided after the voltage detection circuit, which is supplied with the detection voltage signal from the output side of the high frequency inverter to control a phase of the detection voltage signal periodically.

According to a preferred embodiment of the present invention, the phase control circuit comprises a phase delay unit, a phase advance unit and a delayed phase control unit. A phase of the detection voltage is delayed by $\tau_1$ (sec) by the phase delay unit and is advanced by $\tau_2$ (sec) by the phase advance unit. When the delayed phase control unit is off, the total phase control amount of the detection phase control circuit is a leading angle of $\tau_0 = \tau_2 - \tau_1$ while when the delayed phase control unit is on, the lagging phase is $\tau_1'$ (sec) and the total phase control amount is a leading angle of $\tau_0' = \tau_2 - \tau_1'$. In this embodiment $\tau_1 > \tau_1'$, namely $\tau_0' > \tau_0$ or $\tau_0 \approx 0$.

When the delayed phase control unit is off, since the phase control amount is zero, a load voltage is reversed by the resonance frequency of a load circuit and a load current of the resonance frequency is caused to flow through the load circuit.

On the other hand, when the delayed phase control unit is on, the phase control amount is a leading angle ($\tau_0'$) and the commutation is performed earlier as compared with the time when the phase control amount is zero so that the voltage phase reversed time after the commutation is shortened and the frequency is increased.

The frequency of the high frequency power source which supplies electric power to the induction heating furnace can be varied so that vibration of a plated steel plate is varied. Since nodes of the vibration are varied and are not settled, occurrence of a striped pattern formed on the plated steel plate during induction heating which is a serious defect in the quality, is prevented.

In order to achieve the first object, the present invention comprises a series inductor provided in series between a power supply bus line and an induction heating coil, a magnetic member provided to be able to be inserted into and taken out of the series inductor, and a drive device which drives the magnetic member to be inserted into and taken out of the inductor.

According to a preferred embodiment of the present invention, the frequency of the power source used during the induction heating is a parallel resonance frequency of an inductance of the induction heating coil and a capacitance of a condenser connected in parallel with the coil and provided in the power source. Since the inductance of the inductor is varied by inserting a ferrite core driven by the drive device into and out of the inductor, the parallel resonance frequency is varied and the vibration of the plated steel plate is varied periodically. Consequently, since the vibration of the plated steel plate, which is a cause of the striped pattern is varied, the striped pattern formed on the surface of the plated steel plate can be prevented.

Further, in order to achieve the second object, the present invention comprises magnetic flux density alleviating means, disposed in a solenoid coil constituting the induction heating coil, for alleviating the magnetic fluxes concentrated in edge portions of the steel plate.

With such a configuration, since the magnetic fluxes concentrated in the edge portions of the steel plate are alleviated, a temperature distribution of the steel plate can be made uniformed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1 to 10 are drawings explaining the present invention;

FIG. 1 is a diagram showing a structure of an induction heating apparatus;

FIG. 2 is a graph showing a temperature distribution of a steel plate when the steel plate is induction-heated by the induction heating apparatus;

FIG. 3 is a diagram showing a structure of another induction heating apparatus;

FIG. 4 is a graph showing a temperature distribution of the steel plate when the plate is induction-heated by the induction heating apparatus;

FIG. 5 is a diagram showing a structure of still another induction heating apparatus;

FIG. 6 is a diagram showing a circuit configuration of a high frequency power source of the induction heating apparatus;

FIGS. 7 (a) and 7 (b) are diagrams showing operation of the high frequency power source;

FIG. 8 is a diagram showing a structure of a portion of the induction heating apparatus;

FIG. 9 is a diagram showing operation of the induction heating apparatus;

FIG. 10 is a diagram showing a structure of a portion of the induction heating apparatus;

FIG. 11 is a diagram schematically illustrating an induction heating furnace;

FIG. 12 is a diagram taken along line C—C of FIG. 11;

FIG. 13 is a diagram illustrating the formation of a striped pattern with the conventional apparatus;

FIG. 14 is a diagram illustrating the compression force by the conventional apparatus;

FIG. 15 is a diagram explaining illustrating vibration of a plated steel plate of the conventional apparatus;

FIG. 16 is a plan view showing a conventional induction heating apparatus;

FIG. 17 is a front view of the induction heating apparatus of FIG. 16;

FIG. 18 is a diagram illustrating a conventional high frequency power source;

FIG. 19 is an equivalent circuit diagram of the conventional high frequency power source;

FIG. 20 is a diagram illustrating operation of the conventional power source; and FIG. 21 is a graph showing the temperature distribution of the steel plate when the steel plate is induction-heated by the conventional apparatus.

DETAILED DESCRIPTION OF PREFERRED EMBODIMENTS

Figure 1:
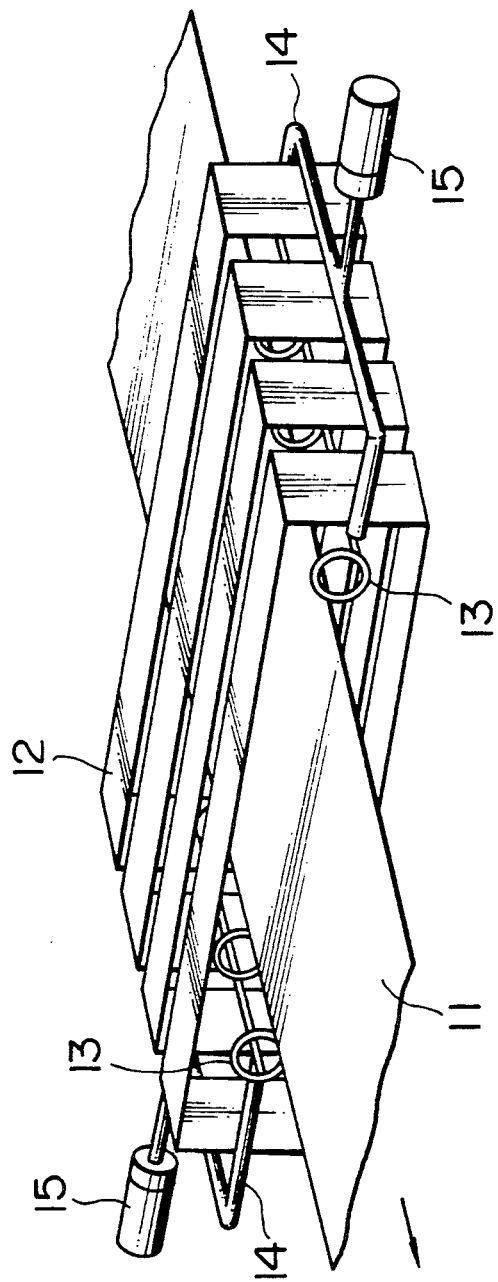

In FIG. 1 showing, a structure of a steel plate induction heating apparatus according to a first embodiment of the present invention is illustrated wherein numeral 11 denotes a steel plate and numeral 12 denotes a solenoid coil which induction-heats the steel plate 11 using a high frequency. A plurality of magnetic flux adjusting rings 13 are disposed separately at right and left sides of the solenoid coil 12 perpendicularly to a moving direction of the steel plate 11, for example about several tens of millimeters from the edge portions of the steel plate 11 at intervals of a pitch of the coil. The magnetic flux adjusting rings 13 serve to alleviate the concentrated magnetic fluxes at the edge portions of the steel plate 11 by means of induced current in the rings and can be moved in the width direction of the steel plate 11 by a drive mechanism including a support 14 and a drive piston 15.

Figure 2:
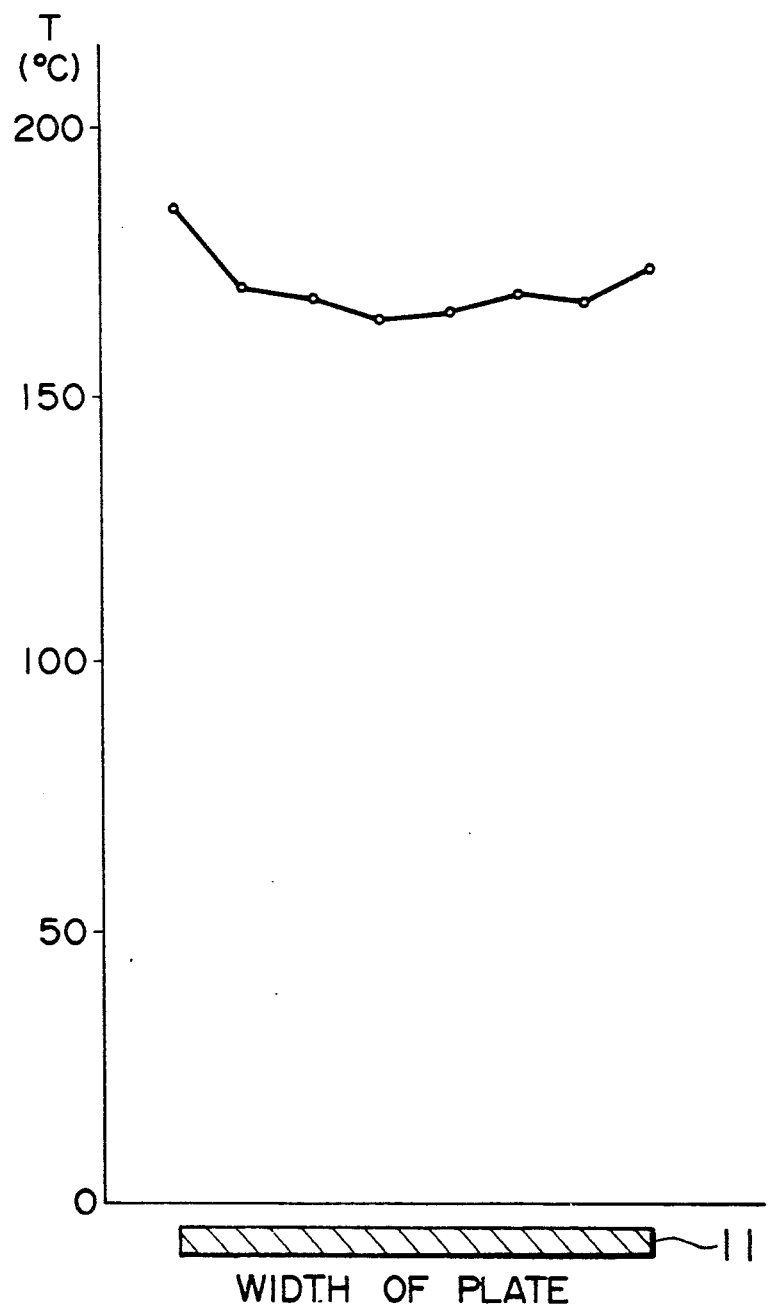

FIG. 2 shows a temperature distribution when the steel plate 11 is induction-heated by the steel plate induction heating apparatus as constructed above. It is apparent from FIG. 2 that the temperature distribution of the steel plate 11 is made uniformed by alleviating the magnetic fluxes concentrated in the edge portions of the steel plate 11 by the magnetic flux adjusting ring 13.

As described above, by disposing the plurality of magnetic flux adjusting rings 13 separately at the right and left sides of the solenoid coil 12 perpendicularly to a moving direction of the steel plate 11 about several tens of millimeters from the edge portions of the steel plate 11 at intervals of a pitch of the coil, since the magnetic fluxes concentrating in the edge portions of the steel plate 11 are alleviated, the steel plate is induction-heated uniformly.

Figure 3:
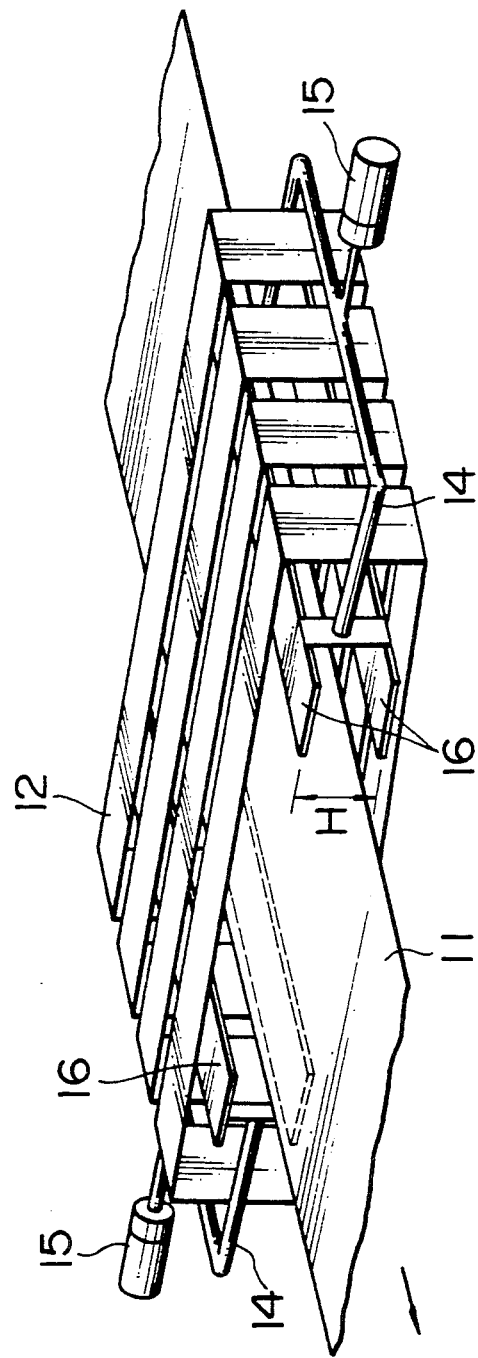

FIG. 3 is a diagram showing a steel plate induction heating apparatus according to a second embodiment of the present invention. In this embodiment, a pair of magnetic shield plates 16, 16 made of copper are disposed at left and right sides of the solenoid coil 12 in opposed relationship with each other so that the edge portions of the steel plate 11 are positioned between the pair of magnetic shield plates 16, 16. The magnetic shield plates 16, 16 serve to alleviate the magnetic fluxes concentrated in the edge portion of the steel plate 11 by means of the resultant magnetic shield and can be moved in the width direction of the steel plate 11 by a drive mechanism including the support 14 and the piston 15, in the same manner as the first embodiment. The magnetic shield plates 16 have a steel plate passage space having a height H and a width of the plate is larger than H/2.

Figure 4:
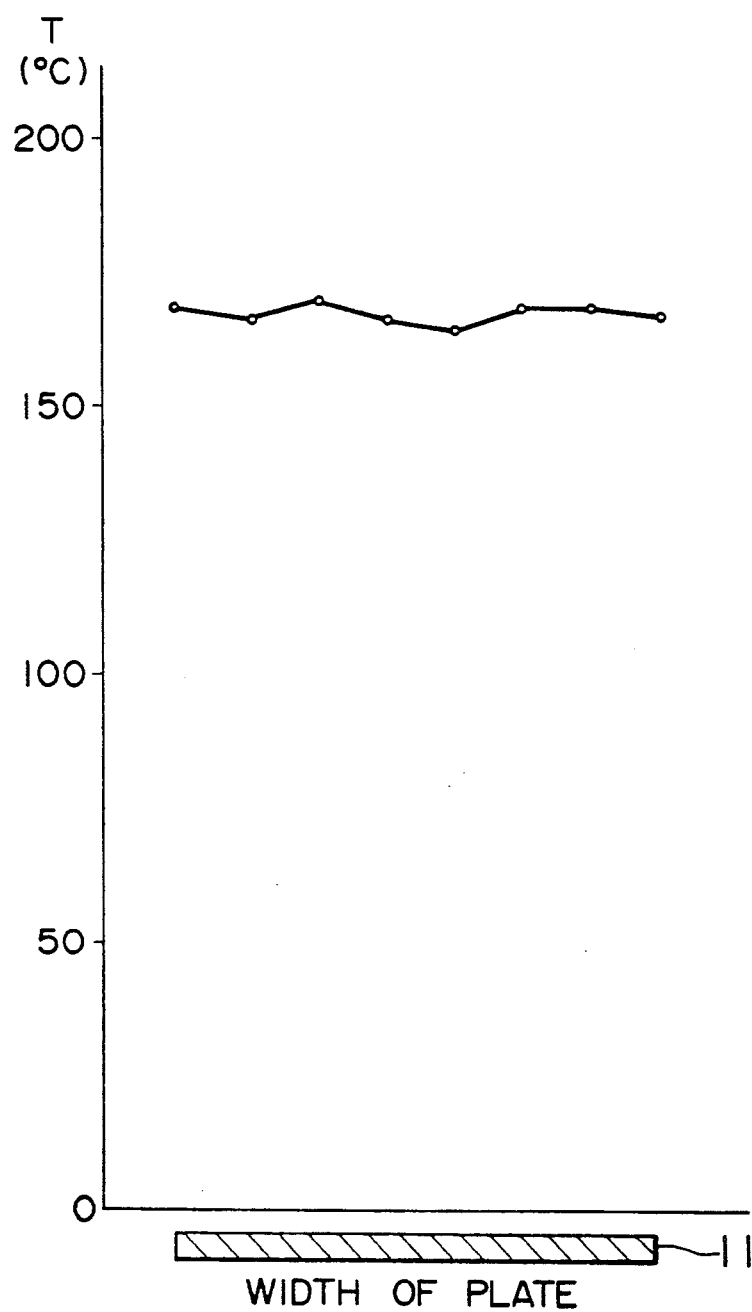

As described above, by disposing the pair of magnetic shield plates 16, 16 at left and right sides of the solenoid coil 12 in opposed relationship with each other with the steel plate passage space having a height H, since the magnetic fluxes concentrated in the edge portions of the steel plate 11 are alleviated, the temperature distribution of the steel plate is made uniform as shown in FIG. 4.

In order to cope with a variation of a dimension (width and thickness) of the steel plate 11 and a variation of a position of the magnetic shield due to meandering, a plate edge detection device 17 and a plate temperature detection device 18 may be disposed at an outlet of the steel plate induction heating apparatus as shown in FIG. 5 and the drive piston 15 may be controlled by signals from the detection devices 17 and 18.

In accordance with the apparatus described above, since the magnetic flux density alleviating means which alleviates the magnetic fluxes concentrated in the edge portions of the steel plate is provided in the solenoid coil, the steel plate can be induction-heated uniformly and Fe density of the alloy steel plate is made uniform. Accordingly, the quality of the steel plate can be improved.

FIG. 6 shows a high frequency power source 20 which supplies a high frequency current to a solenoid coil (induction heating coil) 12. The high frequency power source 20 comprises a high frequency inverter 24 comprised of thyristors 24a, 24b, 24c and 24d connected to a dc power source 21 and having an output connected to a load coil 23 and a condenser 22 which are parallel-resonated, a phase control circuit 29 including a phase delay unit 26, a phase advance unit 27 and a delayed phase control circuit 28 to be supplied with an output voltage of the high frequency inverter 24 for varying the phase of the detected voltage of which a level is converted by a detection voltage transformer 25, and a trigger pulse generating circuit 30 which is supplied with an output signal of the phase control circuit 29 and supplies signals to gates of the thyristors 24a, 24b, 24c and 24d.

With the above circuit configuration, when the delayed phase control circuit 28 is off, since a delay time $\tau_1$(sec) of the phase delay unit 26 is equal to an advance time $\tau_2$(sec) of the phase advance unit 27, the phase control amount is $\tau_0 = \tau_2 - \tau_1 = 0$ and a phase control pulse advanced by $\gamma$ angle, as compared with a load voltage detected by the transformer 25 in the same manner as the conventional apparatus, is generated. On the other hand, when the delayed phase control unit 28 is on, since the delay time is $\tau_1'$(sec)($\tau_1 > \tau_1'$) and the phase control amount is $\tau_0 = \tau_2 - \tau_1' > 0$, the result is that the phase is advanced. The phase control pulse advanced by $\gamma'$ angle ($\gamma' > \gamma$), as compared with the load voltage detected by the transformer 25, is generated.

The delayed phase control unit 28 performs switching of an off state, that is, a state A in which $\gamma$ pulses are produced and an on state, that is, a state B in which $\gamma'$ pulses are produced, at a fixed period as shown in FIG. 7(a). When the delayed phase control unit 28 is off, that is, in the state A in which the $\gamma$ pulses are produced, the trigger pulses supplied to the gates of the thyristors 24a, 24b, 24c and 24d from the trigger pulse generating circuit 30, in the same manner as the conventional apparatus, turns on the pair of thyristors 24b and 24c or 24a and 24d during the on state of the pair of thyristors 24a and 24d or 24b and 24c and the reverse current is caused to flow through the pair of thyristors 24a and 24d or 24b and 24c, which have been turned on earlier by the condenser 22 of the load circuit 31, to turn them off. Since the phase of the trigger pulse is a relatively small advance phase angle $\gamma$ determined by a turning off time of the thyristors 24a, 24b, 24c and 24d, the load voltage is reversed by the resonance frequency fn [Hz] of the load circuit 31 and a load current having the frequency fn is supplied to the load circuit 31.

On the other hand, when the delayed phase control unit 28 is on, that is, in the state B in which the $\gamma'$ pulses are generated, since the advance phase angle of the trigger pulse is $\gamma'$ angle larger than $\gamma$ angle, the pair of thyristors 24a and 24d or 24b and 24c, which have been on earlier, is turned off earlier than the case of the state A. In this case, since the load voltage is larger than that of the case of the state A, a commutation energy larger than that of the case of the state A is required in order to turn off the pair of thyristors 24a and 24d or 24b and 24c. Accordingly, a capacitance of the condenser 22 is slightly reduced apparently and the resonance frequency of the load circuit 31 is slightly increased correspondingly so that the frequency of the load current flowing through the load circuit 31 is slightly increased by 0.3 to 0.5% to be fn+$\alpha$ [Hz] from fn [Hz].

Since the delayed phase control unit 28 is turned on and off repeatedly, the switching of the frequency of the load voltage and the load current is repeated as shown in FIG. 7(b). Thus, the frequency of the high frequency power source which supplies electric power to the solenoid 12 of the induction heating furnace can be varied in the range of about 0.3 to 0.5% in which the heating performance is not affected. Since vibration of the plated steel plate is varied and nodes of the vibration are moved and not settled, the striped pattern formed on the plated steel plate during induction heating, which is a serious defect in quality, can be prevented.

In accordance with the high frequency power source 20 provided in the induction heating apparatus of the embodiment, the provision of the circuit which is supplied with the output signal of the voltage detection circuit varies the phase periodically and can vary the frequency of the high frequency power source which supplies the electric power to the induction heating furnace. The frequency can be varied in the range of about several percent in which the heating performance of the induction heating furnace is not affected, so that since vibration of the plated steel plate is varied and nodes of the vibration are moved and are not settled, the striped pattern formed on the plated steel plate during induction heating and which is a serious defect in quality, can be prevented.

Figure 8:
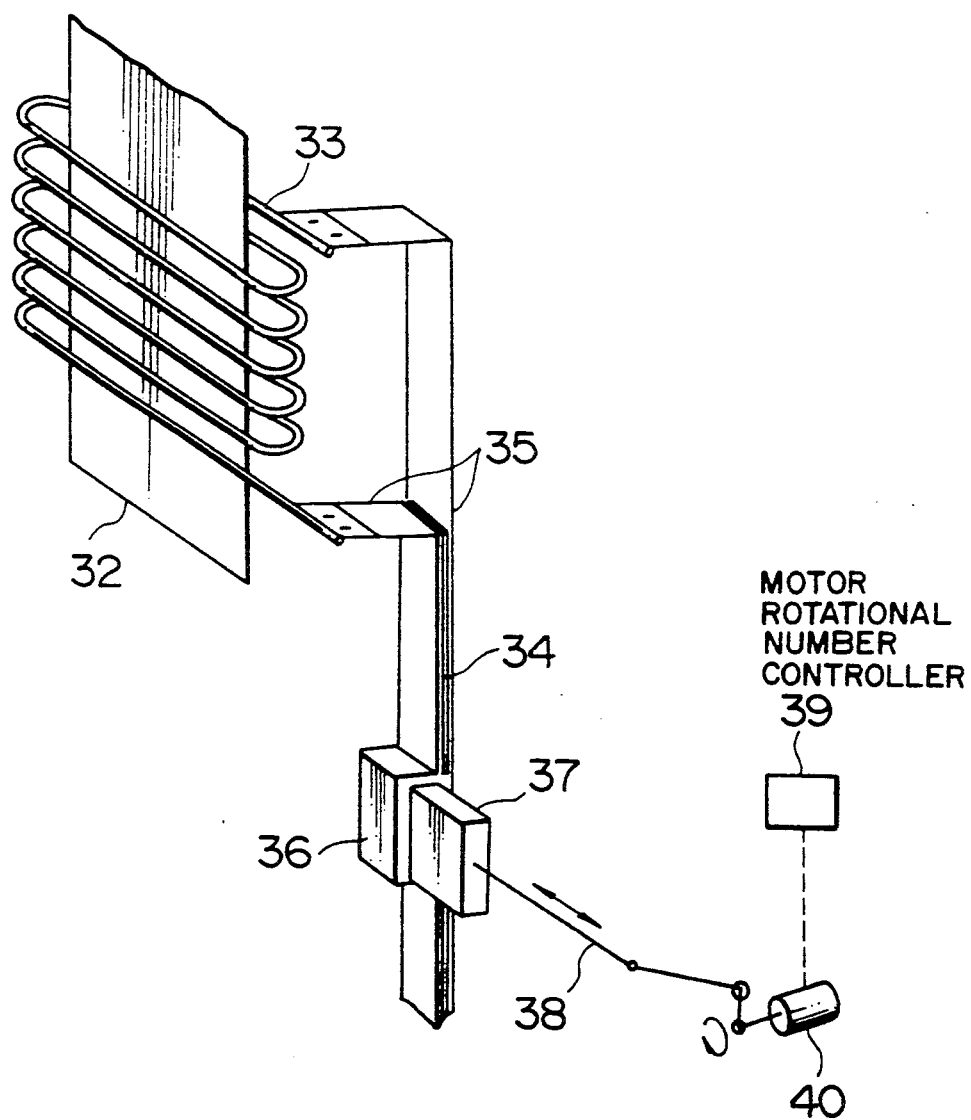

FIG. 8 shows another embodiment of the induction heating apparatus according to the present invention. The induction heating apparatus of the embodiment comprises two power supply bus lines 35 connected to both ends of an induction heating coil 33 into which a plated steel plate 32 passes. The power supply bus lines 35 are disposed close to each other through an insulator 34, with an inductor 36 being formed by separating the two bus lines 35 from each other so that a ferrite core (magnetic member) 37 may be disposed to be inserted into and taken out of the inductor 36. A motor 40 coupled with the ferrite core 37 through a link mechanism 38 and connected to a motor rotational number controller 39 through a conductor.

In the induction heating apparatus as constructed above, while a large current is supplied to the induction heating coil 33 through the bus lines 35, the motor 40 is driven by the motor rotational number controller 39 so that the ferrite core 37 is inserted into and taken out of the inductor 36 periodically through the link mechanism 38.

The frequency of the power source used during the induction heating is a resonance frequency determined by an inductance L [H] of the induction heating coil 33 and a capacitance C [F] of a condenser connected in parallel with the coil 33 and provided in the power source and is expressed by $$f = \frac{1}{2\pi \sqrt{LC}} \text{ [Hz]}$$

Since the inductor 36 is provided between the bus lines 35 and the ferrite core 37 is inserted into and taken out of the inductor 36, the inductance of the bus lines 35 is varied and the total inductance including the inductance of the induction heating coil 33 is also varied so that the frequency of the power source is varied periodically and vibration of the plated steel plate 32 is also varied periodically.

Figure 9:
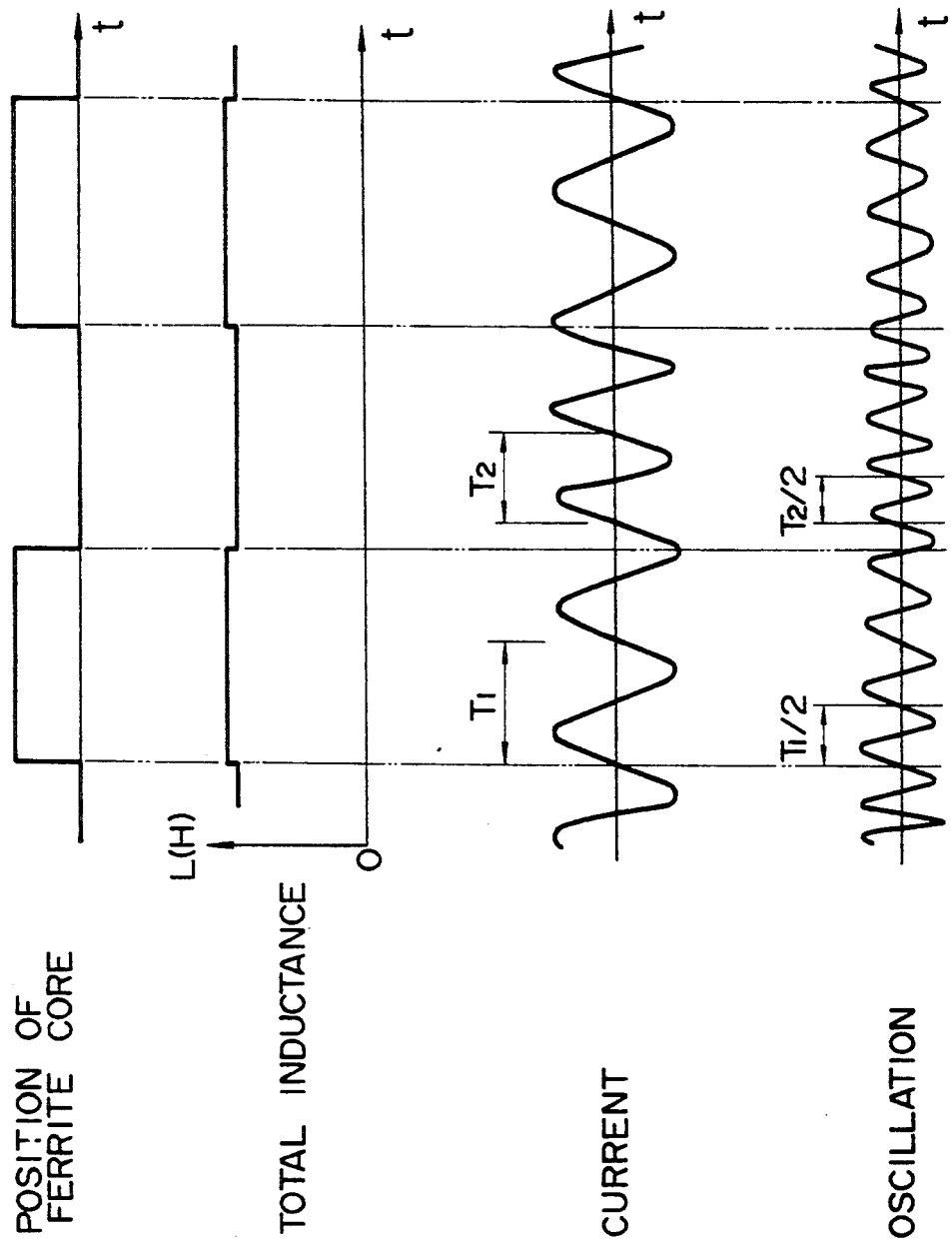

The plated steel plate 32 is vibrated at a frequency twice the frequency of the power source. Further, since the inductance of the bus lines 25 at the time when the ferrite core 37 is inserted into the inductor 36 is larger than that at the time when the ferrite core is not inserted into the inductor, the period $T_1$ of the power current at the time when the ferrite core 37 is inserted is larger than the period $T_2$ at the time when the ferrite core is not inserted, as illustrated in FIG. 9.

Thus, since vibration of the plated steel plate 32 which is a cause of the striped pattern is varied, the striped pattern formed on the surface of the plated steel plate 32 can be prevented.

In the embodiment, the ferrite core 37 is used, although an iron core or other magnetic member can be used therefor.

Figure 10:
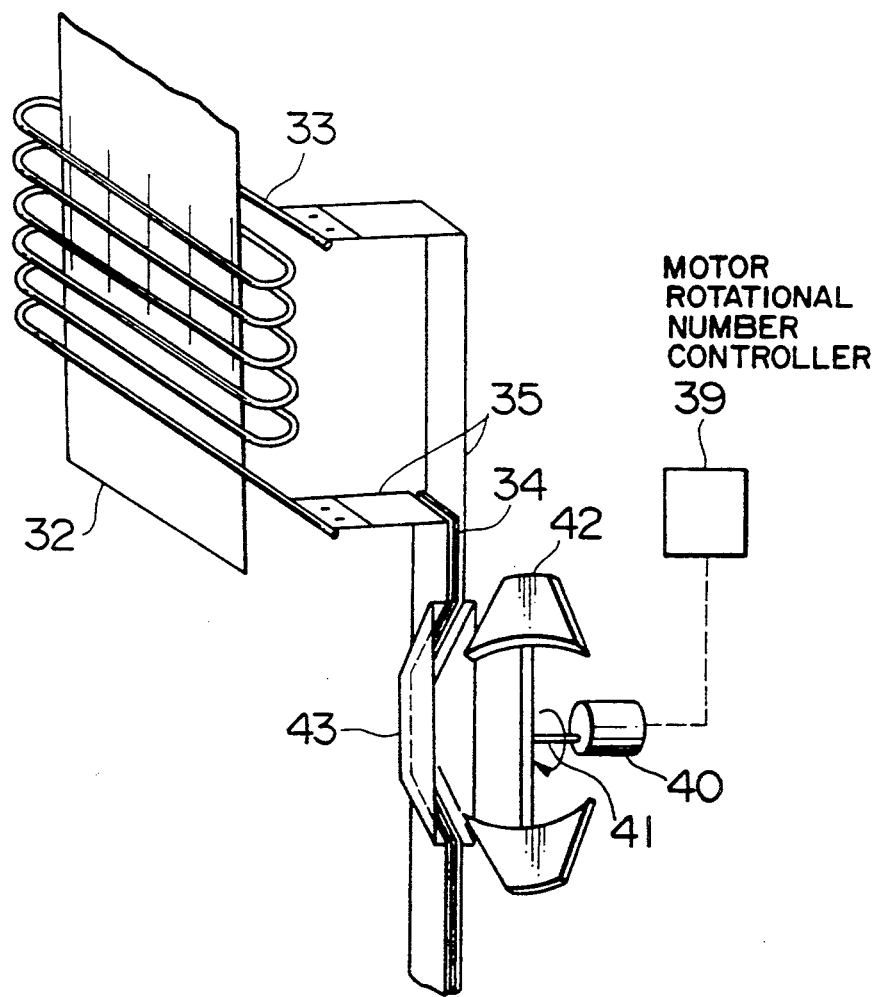
Figure 11:
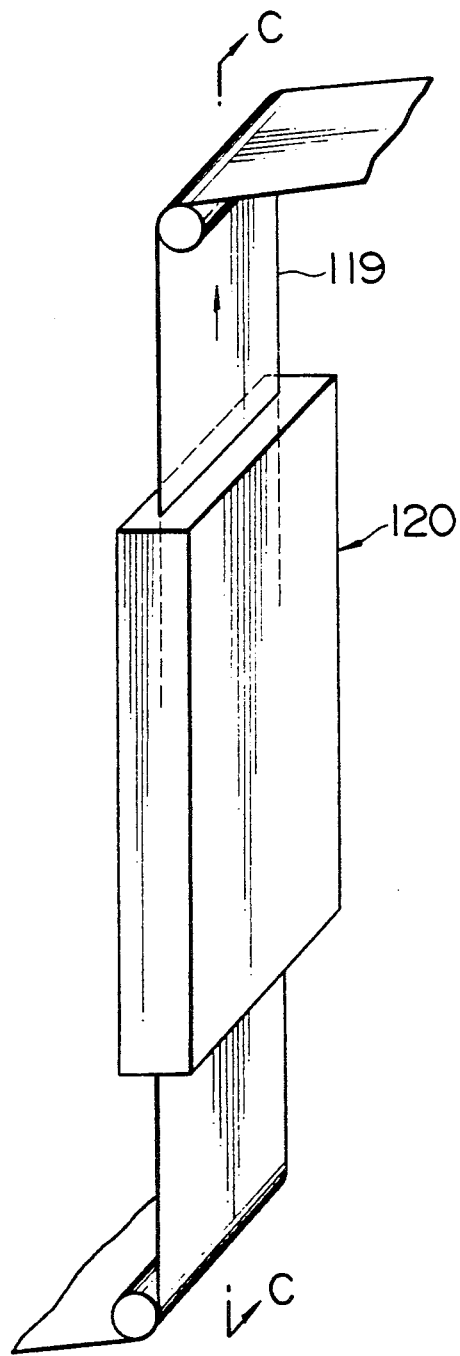
FIGS. 11 to 21 are drawings illustrating the background art.
Figure 12:
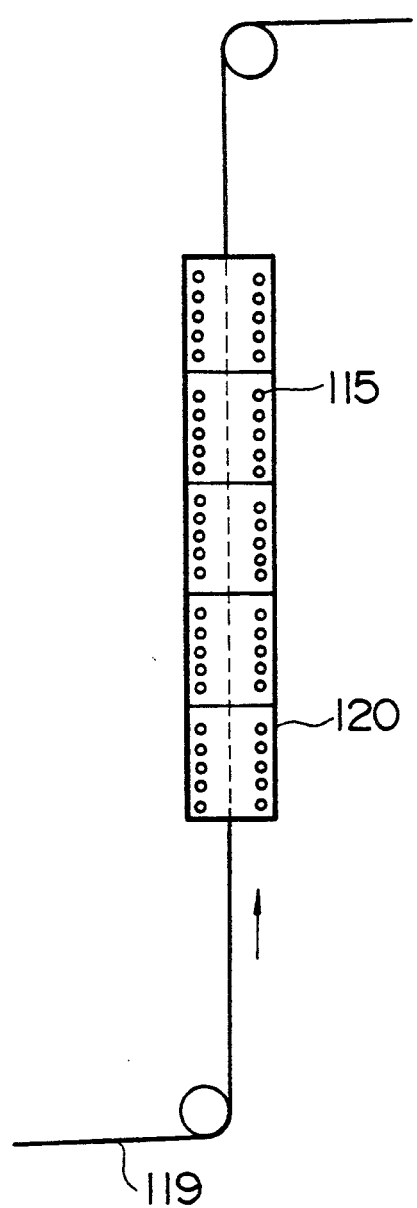
Figure 13:
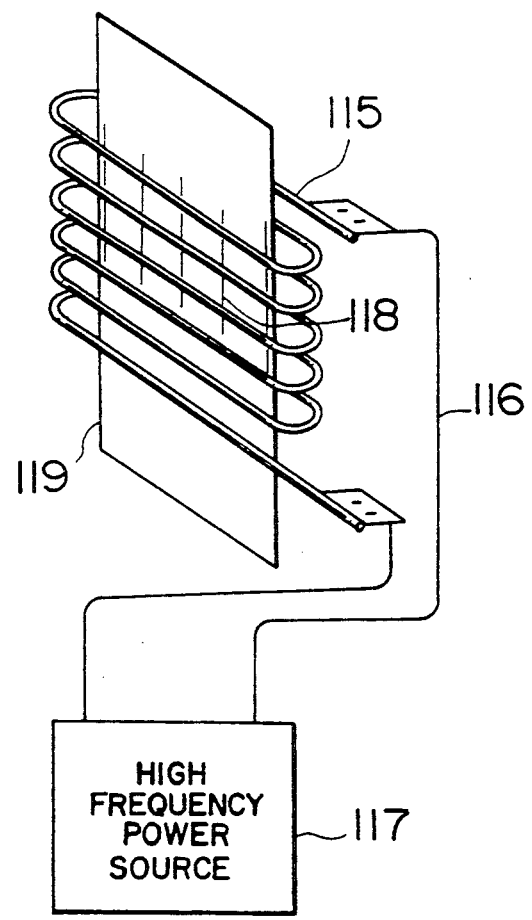
Figure 14:
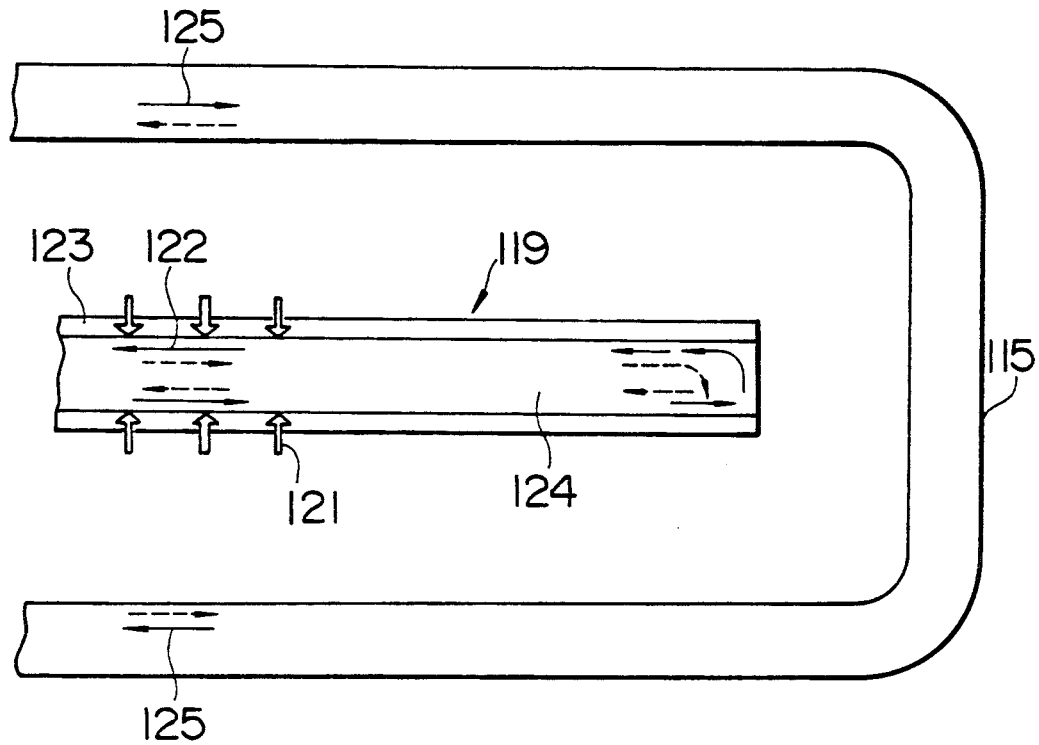
Figure 15:
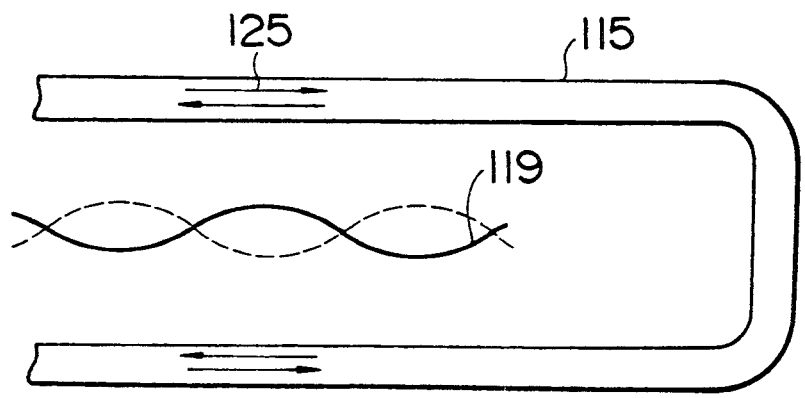
Figure 16:
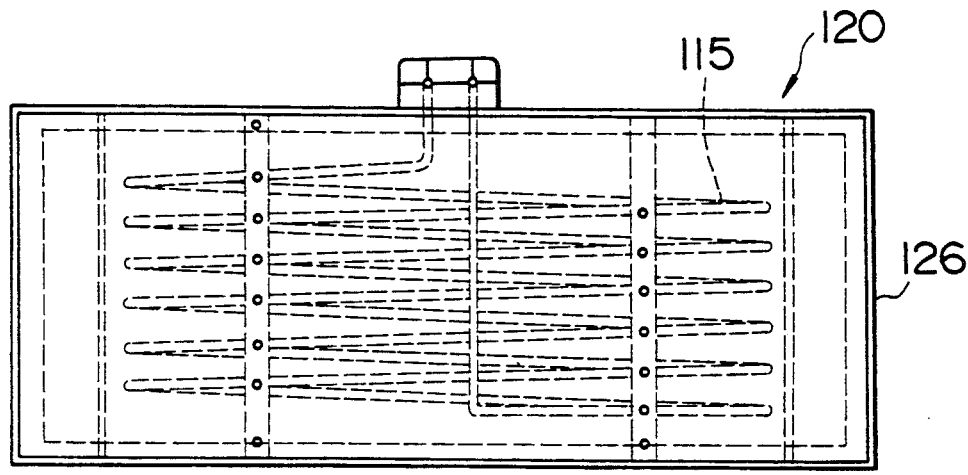
Figure 17:
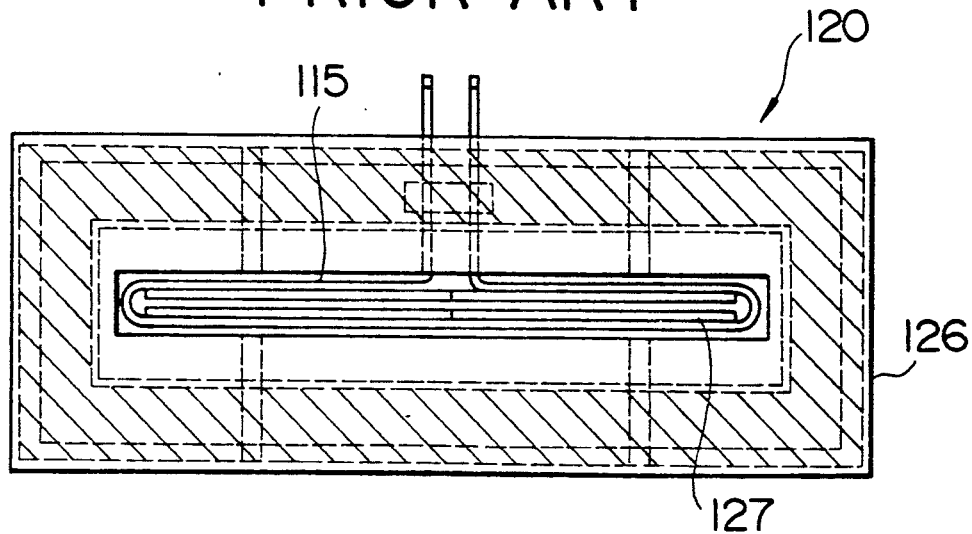
Figure 18:
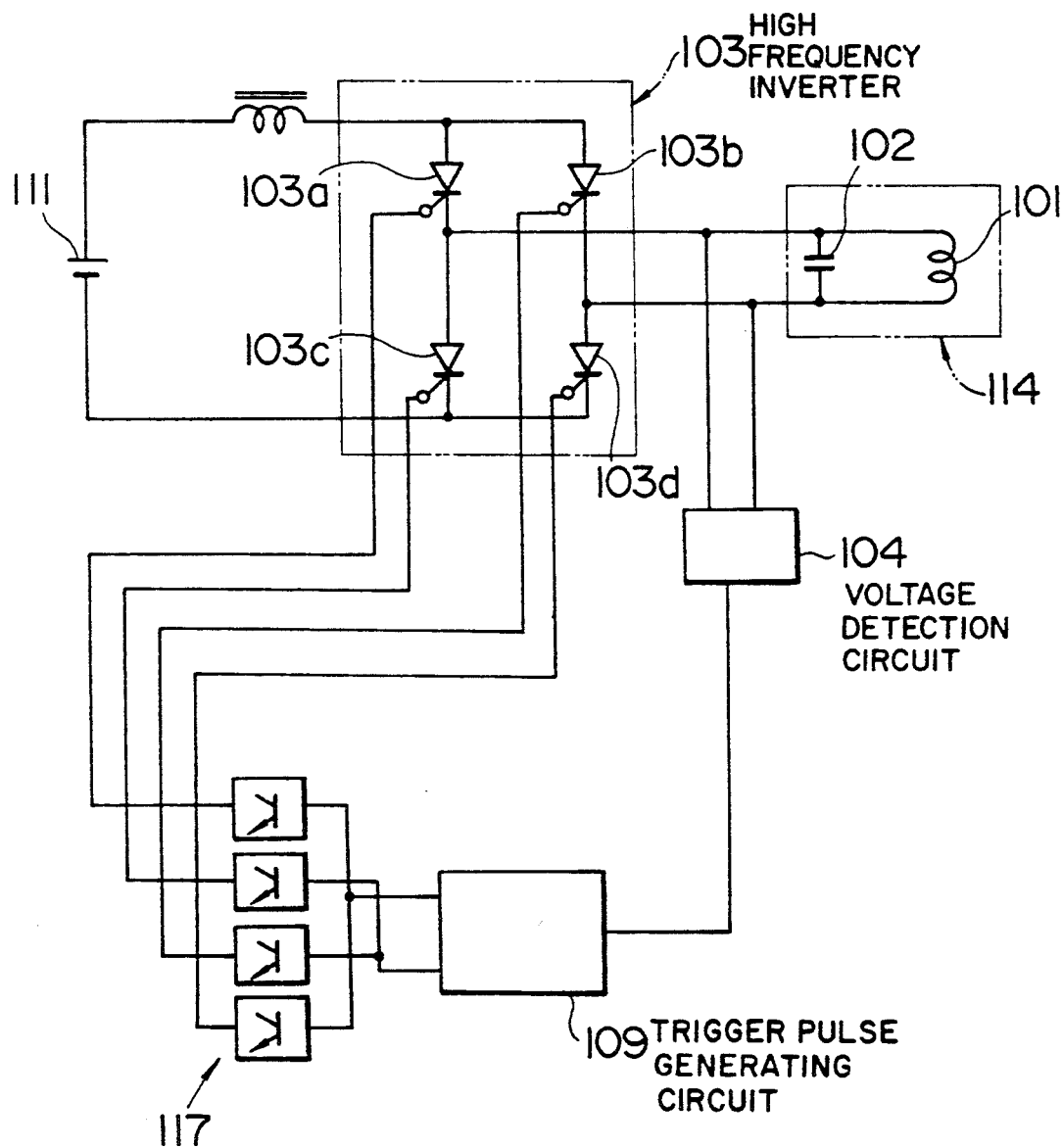
Figure 19:
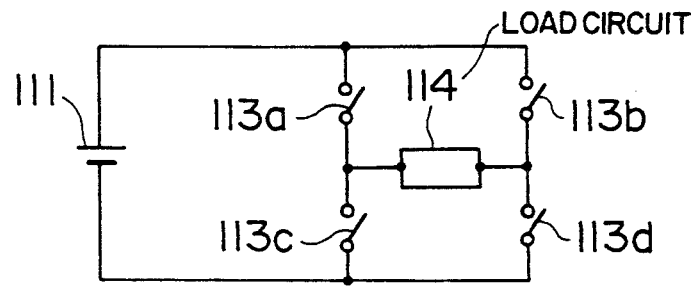
Figure 20:
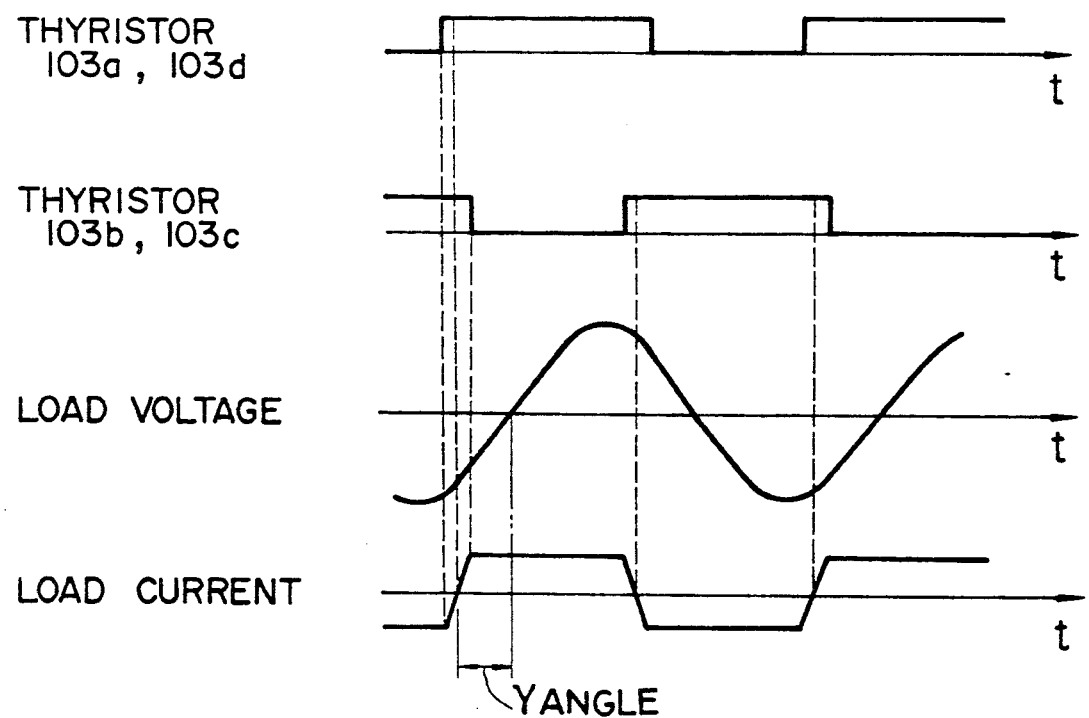
Figure 21:
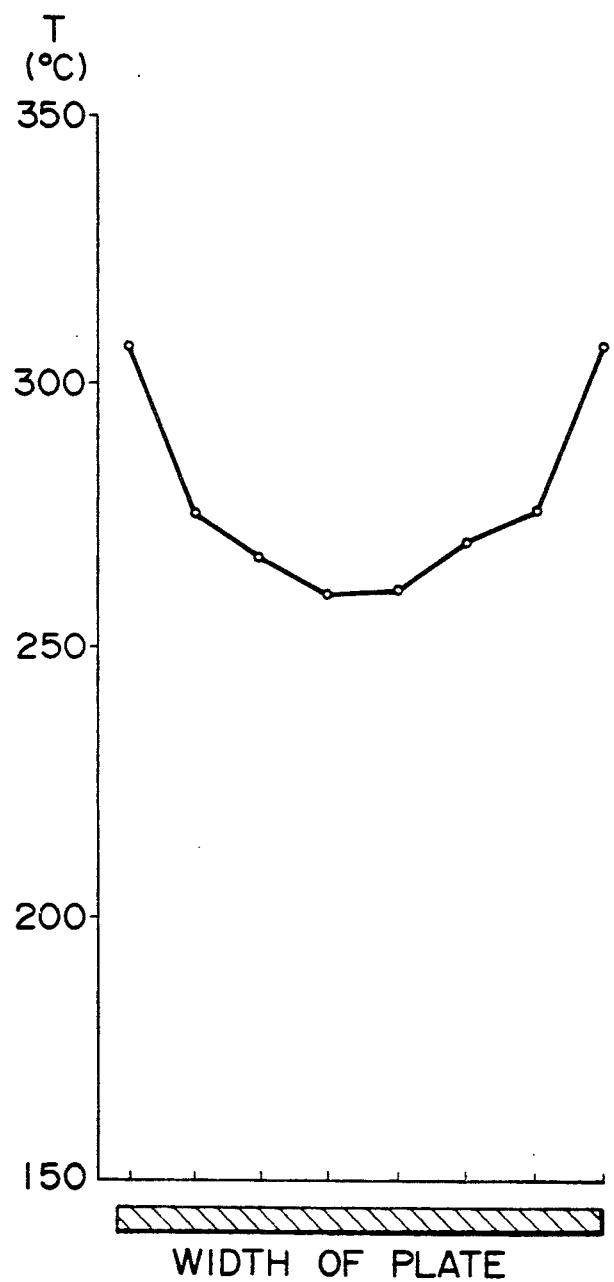

FIG. 10 shows another embodiment of the present invention.

In the embodiment shown in FIG. 10, a motor 40 similar to the motor of the embodiment shown in FIG. 8 is coupled with a ferrite core 42 through a rotation drive mechanism 41, and an inductor 43 is formed so that the rotating ferrite core 42 can be inserted into and taken out from the inductor 43. In the same manner as the embodiment shown in FIG. 8, the rotating ferrite core 42 is inserted into and taken out from the inductor 43 by the motor 40 so that an inductance of the inductor 43 can be varied and vibration of the plated steel plate 32 can be varied periodically to thereby similarly prevent the striped pattern from being formed on the surface of the plated steel plate 32.

In this embodiment, although a ferrite core is also used, an iron core or other magnetic member can be used.

As described above, according to the present invention, the inductor is provided in series between the power supply bus line connected to the induction heating coil. The magnetic member, such as the ferrite core, or the iron core is inserted into and taken out of the inductor by the drive device so that the inductance of the inductor can be varied to change the frequency of the power source. Accordingly, the vibration of the plated steel plate, which is a cause of the striped pattern, can be varied to thereby prevent formation of the striped pattern on the surface of the plated steel plate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An induction heating apparatus for heating a steel plate comprising:
   high frequency heating coils, through which the steel plate is passed therethrough, for heating the steel plate to form processed plated steel;
   high frequency power source means, coupled to said high frequency heating coils, for supplying a high frequency current to said high frequency coils to induce a current in the steel plate to effect heating, for alternating a frequency of said high frequency current between first and second frequencies, and for modulating a phase of said high frequency current so as to vary vibration of the steel plate to prevent formation of stripes in said processed plated steel; and
   flux alleviating means, operatively coupled to drive means which positions said flux alleviating means within said high frequency heating coils, for alleviating concentrated magnetic fluxes at edge portions of the steel plate resulting in uniform temperature distribution along the steel plate during heating,
   said flux alleviating means comprising opposing flat bars through which the edge portions of the steel plate pass therebetween.

2. The induction heating apparatus of claim 1, said flux alleviating means comprising two pairs of said opposing flat bars, each pair alleviating concentrated magnetic fluxes at opposite edge portions of the steel plate.

3. The induction heating apparatus of claim 2, said drive means comprising plate edge detection means and plate temperature detection means disposed at an outlet end of said high frequency heating coils, for generating control signals which control said drive means to position said flux alleviating means adjacent the steel plate to ensure uniform temperature distribution regardless of variation of dimension of the steel plate.

4. The induction heating apparatus of claim 1, said high frequency power source means comprising:

high frequency inverting means, coupled to a dc power source, for driving a load circuit which generates said high frequency current, said high frequency inverting means reversing the polarity of current supplied from said dc power source to said load circuit;

detection voltage means, coupled to a driving output of said high frequency inverting means, for generating a detected load voltage of said driving output; and phase control means, coupled to said detection voltage means, for generating phase control pulses which drive a trigger pulse generator to control said high frequency inverting means, said phase control means generating said phase control pulses advanced by one of a first and second phase amount with respect to said detected load voltage, said high frequency inverting means generating said driving output which directs said load circuit to generate said high frequency current alternating respectively between said first and second frequencies.

5. The induction heating apparatus of claim 4, said load circuit comprising a parallel coupled capacitor and inductor.

6. The induction heating apparatus of claim 4, said phase control means comprising:

phase means, coupled to said detection voltage means, including phase delay means and phase advance mens serially coupled to and respectfully delaying $\tau_1$ seconds and advancing by $\tau_2$ seconds said detected load voltage; and phase delay control means, coupled to said phase delay means, for alternately activating and deactivating said phase delay means.

7. The induction heating apparatus of claim 4, said high frequency inverting means comprising a plurality of thyristors.

8. The induction heating apparatus of claim 1, said high frequency power source comprising:

a pair of power supply bus lines, coupled to a power supply, for supplying power to said high frequency heating coils and disposed in close proximity to each other with an insulator therebetween; and inductor means, formed by separating said pair of power supply bus lines, a ferrite core insertable into said separated portion to change the inductance of said inductor means to thereby generate said high frequency current alternating between said first and second frequencies.

9. The induction heating apparatus of claim 8, said high frequency power source further comprising:

a motor, mechanically linked to said ferrite core, for inserting and removing said ferrite core into said separated portion; and motor rotational number control means, coupled to said motor, for generating an inserting control signal to direct the insertion and removal of said ferrite core in a periodic manner.

10. The induction heating apparatus of claim 1, said high frequency power source comprising:

a pair of power supply bus lines, coupled to a power supply, for supplying power to said high frequency heating coils and disposed in close proximity to each other with an insulator therebetween;

inductor means, formed by separating said pair of power supply bus lines, a rotatable ferrite core rotatingly insertable into said separated portion to change the inductance of said inductor means to thereby generate said high frequency current alternating between said first and second frequencies.

11. The induction heating apparatus of claim 10, said rotatable ferrite core comprising a rod like portion with first and second opposing ends with respective first and second ferrite members disposed thereon.

12. The induction heating apparatus of claim 11, said high frequency power source further comprising:

a motor, mechanically linked to said rod-like portion, for rotating said rotatable ferrite core into and out of said separated portion; and motor rotational number control means, coupled to said motor, for generating a rotation control signal to direct rotation of said rotatable ferrite core into and out of said separated portion in a periodic manner.

13. An induction heating apparatus for heating a steel plate comprising:

high frequency heating coils, through which the steel plate is passed therethrough, for heating the steel plate to form processed plated steel;

a high frequency power source, coupled to said high frequency heating coils, for supplying a high frequency current to said high frequency coils to induce a current in the steel plate to effect heating, comprising high frequency inverting means, coupled to a dc power source, for driving a load circuit which generates said high frequency current, said high frequency inverting means reversing the polarity of current supplied from said dc power source to said load circuit, detection voltage means, coupled to a driving output of said high frequency inverting means, for generating a detected load voltage of said driving output, and phase control means, coupled to said detection voltage means, for generating phase control pulses which drive a trigger pulse generator to control said high frequency inverting means, said phase control means generating said phase control pulses advanced by one of a first and second phase amount with respect to said detected load voltage, said high frequency inverting means generating said driving output which directs said load circuit to generate said high frequency current alternating respectively between a first and second frequency to vary vibration of the steel plate to prevent formation of stripes in said processed plated steel; and flux alleviating means, operatively coupled to drive means which positions said flux alleviating means within said high frequency heating coils, for alleviating concentrated magnetic fluxes at edge portions of the steel plate resulting in uniform temperature distribution along the steel plate during heating.

14. The induction heating apparatus of claim 13, said load circuit comprising a parallel coupled capacitor/inductor pair.

15. The induction heating apparatus of claim 14, said phase control circuit comprising:
   phase means, coupled to said detection voltage means, including phase delay means and phase advance means serially coupled to and respectively delaying by $\tau_1$ seconds and advancing by $\tau_2$ seconds said detected load voltage; and
   phase delay control means, coupled to said phase delay means, for alternately activating and deactivating said phase delay means.

16. The induction heating apparatus of claim 13, said high frequency inverting means comprising a plurality of thyristors.

17. The induction heating apparatus of claim 13, said drive means comprising plate edge detection means and plate temperature detection means disposed at an outlet end of said high frequency heating coils, for generating control signals which control said drive means to position said flux alleviating means adjacent the steel plate to ensure uniform temperature distribution regardless of variation of dimension of the steel plate.

18. The induction heating apparatus of claim 13, said flux alleviating means comprising opposing flat bars through which the edge portions of the steel plate pass therebetween.

19. The induction heating apparatus of claim 18, said flux alleviating means comprising two pairs of said opposing flat bars, each pair alleviating concentrated magnetic fluxes at opposite edge portions of the steel plate.

20. The induction heating apparatus of claim 19, said drive means comprising plate edge detection means and plate temperature detection means disposed at an outlet end of said high frequency heating coils, for generating control signals which control said drive means to position said flux alleviating means adjacent the steel plate to ensure uniform temperature distribution regardless of variation of dimension of the steel plate.

21. The induction heating apparatus of claim 13, said flux alleviating means comprising rod means with a plurality of magnetic flux adjusting rings disposed thereon.

22. The induction heating apparatus of claim 21, said flux alleviating means comprising two rods, each alleviating concentrated magnetic fluxes at opposite edge portions of the steel plate.

23. The induction heating apparatus of claim 22, said drive means comprising plate edge detection means and plate temperature detection means disposed at an outlet end of said high frequency heating coils, for generating control signals which control said drive means to position said flux alleviating means adjacent the steel plate to ensure uniform temperature distribution regardless of variation of dimension of the steel plate.

24. An induction heating apparatus for heating a steel plate comprising:
   high frequency heating coils, through which the steel plate is passed therethrough, for heating the steel plate to form processed plated steel;
   high frequency power source means, coupled to said high frequency heating coils, for supplying a high frequency current to said high frequency coils to induce a current in the steel plate to effect heating, for alternating a frequency of said high frequency current between first and second frequencies, and for modulating a phase of said high frequency current so as to vary vibration of the steel plate to prevent formation of stripes in said processed plated steel; and
   flux alleviating means, operatively coupled to drive means which positions said flux alleviating means within said high frequency heating coils, for alleviating concentrated magnetic fluxes at edge portions of the steel plate to resulting in uniform temperature distribution along the steel plate during heating.

25. An induction heating apparatus for heating a steel plate comprising:
   high frequency heating coils, through which the steel plate is passed therethrough, for heating the steel plate to form processed plated steel; and
   a high frequency power source, coupled to said high frequency heating coils, for supplying a high frequency current to said high frequency coils to induce a current in the steel plate to effect heating, comprising
      high frequency inverting means, coupled to a dc power source, for driving a load circuit which generates said high frequency current, said high frequency inverting means reversing the polarity of current supplied from said dc power source to said load circuit,
      detection voltage means, coupled to a driving output of said high frequency inverting means, for generating a detected load voltage of said driving output, and
      phase control means, coupled to said detection voltage means, for generating phase control pulses which drive a trigger pulse generator to control said high frequency inverting means,
      said phase control means generating said phase control pulses advanced by one of a first and second phase amount with respect to said detected load voltage, said high frequency inverting means generating said driving output which directs said load circuit to generate said high frequency current alternating respectively between a first and second frequency to vary vibration of the steel plate to prevent formation of stripes in said processed plated steel.

26. The induction heating apparatus of claim 25, said load circuit comprising a parallel coupled capacitor/inductor pair.

27. The induction heating apparatus of claim 26, said phase control circuit comprising:
   phase means, coupled to said detection voltage means, including phase delay means and phase advance means serially coupled to and respectively delaying by $\tau_1$ seconds and advancing by $\tau_2$ seconds said detected load voltage; and
   phase delay control means, coupled to said phase delay means, for alternately activating and deactivating said phase delay means.

28. An induction heating apparatus for heating a steel plate comprising:
   high frequency heating coils, through which the steel plate is passed therethrough, for heating the steel plate to form processed plated steel; and
   high frequency power source means, coupled to said high frequency heating coils, for supplying a high frequency current to said high frequency coils to induce a current in the steel plate to effect heating, for alternating a frequency of said high frequency current between first and second frequencies, and for modulating a phase of said high frequency current so as to vary vibration of the steel plate to prevent formation of stripes in said processed plated steel.

* * * * *